UNITED STATES PATENT OFFICE.

WILLIAM AYLING, OF CHICAGO, ILLINOIS.

LIQUID WATER-PROOF STOVE-POLISH.

SPECIFICATION forming part of Letters Patent No. 257,456, dated May 9, 1882.

Application filed December 5, 1881. (Specimens.)

*To all whom it may concern:*

Be it known that I, WILLIAM AYLING, of Chicago, in the county of Cook and State of Illinois, have invented a new and useful Liquid Water-Proof Polish, of which the following is such a full, clear, concise, and exact description as will enable others to compound and apply the same.

The more essential ingredients of my polish are crude gum-turpentine, aqua-ammonia, water, alcohol, and plumbago. The crude gum-turpentine is dissolved in ammonia and water by boiling. When dissolved the solution is strained and clarified with alcohol. The plumbago is then stirred in. The polish is then put up in bottles and is ready for the market.

I will now describe more in detail my method of preparing the polish, giving the proportions of the different ingredients which I have found when mixed together make the best compound, and I will also mention certain other elements that may be usefully employed in combination with the aforesaid more essential ingredients. Take four pounds of crude gum-turpentine, which is the hardened juice of the pine, and known also as "gum-resin," and add thereto three gallons of water and four pounds of XXX aqua-ammonia. Then boil, preferably under pressure, until the crude gum-turpentine is thoroughly dissolved. When the crude gum-turpentine is thus dissolved remove from the fire and strain. When cold add to the solution about three pints of ninety-five percentum alcohol. The alcohol makes the solution thin and limpid, so that it does not curdle or become saponaceous. A transparent varnish is thus formed. About four pounds of pulverized plumbago are now added and thoroughly stirred in. I use preferably a mixture of pure plumbago and crude plumbago and lamp-black. I then add preferably about an ounce of nigrozine or "aniline-black," as it is more commonly called, dissolved in a quart of warm or boiling water. In order to destroy all odors that might be considered in the least offensive when the polish is used upon hot iron, I add also a small quantity of powdered gum-benzoine—one ounce to the gallon I find sufficient. The article thus prepared may be put up in bottles or in any other well-known way, so as to prevent the aqua-ammonia and other volatile portions of the mixture from evaporating. Shake the bottle before using, and apply to the stove or surface to be polished with a sponge or brush in the usual manner. The ammonia soon evaporates, and the gum-turpentine hardens, holding the black pulverized mineral substance and forming therewith a brilliant, durable, and water-proof polish.

In case this enamel or coating of polish becomes tarnished or soiled it may be cleaned with a moist sponge or brush, and then polished with a brush as before.

I have tried many other ingredients in place of the crude gum-turpentine, but find nothing equally good when used in combination with aqua-ammonia and plumbago.

If the vessel containing the boiling solution be not closely covered, the ammonia evaporates so that it is necessary to add more ammonia in order to dissolve the gum-turpentine. If more crude gum-turpentine be used, it becomes necessary to increase the amount of aqua-ammonia proportionately.

I do not limit myself to the exact proportions named above, provided the crude gum-turpentine is dissolved in aqua-ammonia and water and combined with plumbago, so as to harden and hold the plumbago, or its equivalent, after the volatile portion of the mixture has evaporated.

I claim as my invention and desire to secure by Letters Patent—

The herein-described composition of matter for polishing stoves, consisting of crude gum-turpentine, aqua-ammonia, water, alcohol, and plumbago, substantially in the proportions specified.

WILLIAM AYLING.

Witnesses:
GEORGE P. BARTON,
HARRY KOHN.